United States Patent
Akita

(10) Patent No.: US 10,041,406 B2
(45) Date of Patent: Aug. 7, 2018

(54) FLOW RATE MEASUREMENT DEVICE, FUEL EFFICIENCY MEASUREMENT DEVICE, PROGRAM FOR FLOW RATE MEASUREMENT DEVICE AND FLOW RATE MEASUREMENT METHOD

(71) Applicant: HORIBA, Ltd., Kyoto (JP)

(72) Inventor: Masanobu Akita, Kyoto (JP)

(73) Assignee: Horiba, Ltd., Kyoto (JP)

( * ) Notice: Subject to any disclaimer, the term of this patent is extended or adjusted under 35 U.S.C. 154(b) by 8 days.

(21) Appl. No.: 15/365,205

(22) Filed: Nov. 30, 2016

(65) Prior Publication Data
US 2017/0167372 A1    Jun. 15, 2017

(30) Foreign Application Priority Data
Dec. 15, 2015 (JP) ................. 2015-244563

(51) Int. Cl.
| | |
|---|---|
| *F02B 77/08* | (2006.01) |
| *F01N 11/00* | (2006.01) |
| *F02D 41/18* | (2006.01) |
| *G01F 1/66* | (2006.01) |
| *G01M 15/10* | (2006.01) |
| *G01F 9/00* | (2006.01) |

(Continued)

(52) U.S. Cl.
CPC .......... *F02B 77/084* (2013.01); *F01N 11/00* (2013.01); *F02B 77/086* (2013.01); *F02D 41/1445* (2013.01); *G01F 1/667* (2013.01); *G01F 9/00* (2013.01); *G01F 15/043* (2013.01); *G01M 15/102* (2013.01); *F01N 2560/025* (2013.01); *F01N 2560/06* (2013.01); *F01N 2560/07* (2013.01); *F01N 2560/12* (2013.01); *F02D 41/1446* (2013.01); *G01F 1/668* (2013.01); *Y02T 10/47* (2013.01)

(58) Field of Classification Search
CPC ...... F02B 77/084; F02B 77/086; F01N 11/00; F02D 41/18; G01F 1/667
See application file for complete search history.

(56) References Cited

U.S. PATENT DOCUMENTS

| | | | |
|---|---|---|---|
| 2015/0260612 A1 | 9/2015 | DeSilva et al. | |
| 2017/0002720 A1* | 1/2017 | Naik | ............ F04B 49/02 |

FOREIGN PATENT DOCUMENTS

| | | |
|---|---|---|
| CA | 2884069 A1 | 3/2014 |
| JP | 2015-036623 A | 2/2015 |

OTHER PUBLICATIONS

EESR dated Apr. 3, 2017 issued for European patent application No. 16 200 782.7, 12 pgs.

* cited by examiner

*Primary Examiner* — Basil T Jos
(74) *Attorney, Agent, or Firm* — Brooks Kushman P.C.

(57) ABSTRACT

In order to provide a flow rate measurement device that can measure a flow rate of a sample fluid passing a tube body with high accuracy even though temperature irregularity of the sample fluid generates along a radial direction of the tube body, the flow rate measurement device comprise a temperature measurement device that measures a mean temperature of a sample fluid discharged from an internal combustion engine or temperature distribution of the sample fluid along a radial direction of the tube body, and a flow rate of the sample fluid is measured based on the mean temperature or the temperature distribution measured by the temperature measurement device.

7 Claims, 3 Drawing Sheets

(51) Int. Cl.
*G01F 15/04* (2006.01)
*F02D 41/14* (2006.01)

FLOW RATE MEASUREMENT DEVICE, FUEL EFFICIENCY MEASUREMENT DEVICE, PROGRAM FOR FLOW RATE MEASUREMENT DEVICE AND FLOW RATE MEASUREMENT METHOD

CROSS-REFERENCE TO RELATED APPLICATION

This application claims priority to JP Application No. 2015-244563, filed Dec. 15, 2015, the disclosure of which is incorporated in its entirety by reference herein.

FIELD OF THE ART

This invention relates to a flow rate measurement device that measures a flow rate of, for example, an exhaust gas discharged from an internal combustion engine.

BACKGROUND ART

In order to measure an amount of various components contained in an exhaust gas of an internal combustion engine or fuel consumption, it is necessary to measure a flow rate of the exhaust gas in addition to a concentration of the above-mentioned components. Conventionally, as shown in the patent document 1, the flow rate of the exhaust gas is measured by mounting a flow meter of an ultrasonic type on a tube body connected in series to, for example, a tail pipe of a vehicle or an internal combustion engine.

At this time, a temperature sensor is provided and temperature of the exhaust gas is also measured at a time of measuring the flow rate. The reasons are that the temperature of the exhaust gas is necessary in case that a normal conversion is executed on the measured flow rate (the measured flow rate is converted into a volume flow rate in a normal state, in other words 0 degree Celsius, 101.325 kPas·abs) and that the fluid temperature is a parameter at a time of measuring the flow rate not only for the ultrasonic wave flow meter but also for the flow meters of various types.

The temperature sensor is ordinarily arranged to locate its sensor body near the center of the flow channel so as to make it possible to measure the temperature of the exhaust gas that flows in the center of the flow channel.

In case of measuring a fuel efficiency of the internal combustion engine or measuring a component of the exhaust gas, it is, so to speak, a common knowledge that the temperature near the center of the flow of the exhaust gas flow indicates the temperature of the exhaust gas, and the temperature is considered to be a parameter at a time of calculating the flow rate of the exhaust gas. In addition, no case is found that any particular problem occurs.

However, under a special test condition such as an oil mixing test of the diesel engine, it becomes clear that an error occurs in the measured flow rate by the above-mentioned flow rate measurement method. As a result of keen examination of the present claimed inventor, this inventor first found the cause for why the error occurs.

More specifically, the tube body on which the flow meter is mounted is heated to about 100 degree Celsius by a heater in order to prevent condensation of water or THC on an inner wall surface of the tube body. In the above-mentioned oil mixing test, a rotational number of the internal combustion engine is raised at once and the flow rate is continuously measured by flowing the exhaust gas whose temperature reaches a maximum temperature of 300 degree Celsius for a considerable long period of time. Under this special condition, since the temperature of the inner wall of the tube body becomes considerably low compared with the temperature of the exhaust gas for a while after the exhaust gas starts flowing because a circumferential part of the exhaust gas is cooled down by the tube body, a big difference is caused between the temperature of the exhaust gas flowing near the inner wall of the tube body and the temperature of the exhaust gas flowing near the center where the temperature is kept constant. As a result of this, in accordance with a conventional method wherein the temperature of the exhaust gas in the center is measured, the influence on the circumferential part of the exhaust gas due to temperature drop is ignored, resulting in a measurement error.

In contrast, in a general mode running test, there is no chance that the exhaust gas of the high temperature continues flowing at once at a first arrival time so that it is hardly possible there is some problem in measuring the flow rate by the conventional measurement method.

PRIOR ART DOCUMENT

Patent Document

Patent document 1: Japanese Unexamined Patent Application Publication No. 2015-36623

SUMMARY

Disclosure of the Invention

Problems to be Solved by the Invention

The present claimed invention intends to solve all of the problems and a main object of this invention is to provide a flow rate measurement device that can measure a flow rate of a sample fluid flowing in a tube body with high accuracy even though temperature of the sample fluid is uneven in a radial direction of the tube body.

More specifically, the flow rate measurement device in accordance with this invention comprises a temperature measurement device that measures a mean temperature of a sample fluid that flows in a tube body or temperature distribution of the sample fluid along a radial direction of the tube body, and is characterized by measuring a flow rate of the sample fluid based on the above-mentioned mean temperature or the temperature distribution measured by the temperature measurement device.

Concretely, the sample fluid is an exhaust gas that is discharged from an internal combustion engine and that flows in the tube body, and the temperature measurement device measures the mean temperature of the exhaust gas that is discharged from the internal combustion engine and that flows in the tube body or the temperature distribution of the exhaust gas along the radial direction of the tube body.

In accordance with this arrangement, it is possible to measure the flow rate of the exhaust gas with high accuracy even though the temperature of the exhaust gas as being the sample fluid that flows in the tube body is uneven in the radial direction of the tube body. As a result of this, it is possible to reduce an error of a normal flow rate as being the flow rate of the exhaust gas at a time when a normal conversion is executed.

More concretely represented is the flow rate measurement device that comprises a pair of ultrasonic wave transmitter-receivers and measures the flow rate of the sample fluid based on a propagation time of an ultrasonic wave that passes and propagates through the sample fluid between these ultrasonic wave transmitter-receivers. At this time it is preferable that the temperature measurement device calculates the mean temperature of the sample fluid based on the propagation time.

In accordance with this arrangement, since a part of the flow meter is utilized as the temperature measurement device, there is no need of arranging a dedicated temperature sensor in the tube body so that the arrangement of the flow rate measurement device can be simplified and it is also possible to flow the sample fluid in the tube body without any resistance.

More preferably, it can be represented that the temperature measurement device calculates the mean temperature of the exhaust gas further based on an air-fuel ratio of the internal combustion engine measured by an air-fuel ratio sensor.

As a concrete arrangement to calculate the flow rate of the exhaust gas and the temperature of the exhaust gas based on the propagation time, it can be represented that the flow rate measurement device comprises a pair of ultrasonic wave transmitter-receivers and calculates the flow rate of the exhaust gas based on a difference between a reciprocal number of the propagation time of the ultrasonic wave that propagates in the upstream direction of the exhaust gas between a pair of the ultrasonic wave transmitter-receivers and a reciprocal number of the propagation time of the ultrasonic wave that propagates in the downstream direction of the exhaust gas between a pair of the ultrasonic wave transmitter-receivers, and is characterized by that the flow rate of the exhaust gas is calculated further based on the temperature of the exhaust gas calculated from a sum of the reciprocal numbers of the above-mentioned each of the propagation times.

If a fuel efficiency measurement device comprises the flow rate measurement device in accordance with this invention and a fuel efficiency calculation device that calculates fuel efficiency based on the flow rate of the exhaust gas measured by the flow rate measurement device, it is possible to measure the fuel efficiency more accurately based on the flow rate of the exhaust gas that is more accurate than that based on a conventional fuel efficiency measurement device.

In order to make it possible to provide a conventional flow rate measurement device with a function similar to that of this invention and to measure the flow rate of the sample fluid more accurately, programs may be installed to the conventional flow rate measurement device by the use of a program storage medium that stores a program that is loaded on the flow rate measurement device that comprises a pair of ultrasonic wave transmitter-receivers and a calculation part that calculates a flow rate of a sample fluid based on a propagation time of an ultrasonic wave that passes through the sample fluid and that propagates between a pair of the ultrasonic wave transmitter-receivers, wherein the calculation part is provided with a function of calculating a mean temperature of the sample fluid based on the propagation time and a function of calculating the flow rate of the sample fluid based on the mean temperature.

The program storage medium may be various storage media such as a CD, a DVD, an HD or a flash memory, or the programs themselves may be electrically delivered.

Effect of the Invention

In accordance with the arrangement of this invention, it is possible to measure the flow rate of the sample fluid with high accuracy even though the temperature of the sample fluid is uneven. As a result of this, it is possible to reduce an error of a normal flow rate as being the flow rate of the sample fluid at a time when a normal conversion is executed.

BEST MODES OF EMBODYING THE INVENTION

A fuel efficiency measurement device in accordance with this invention will be explained with reference to drawings.

Figure 1:
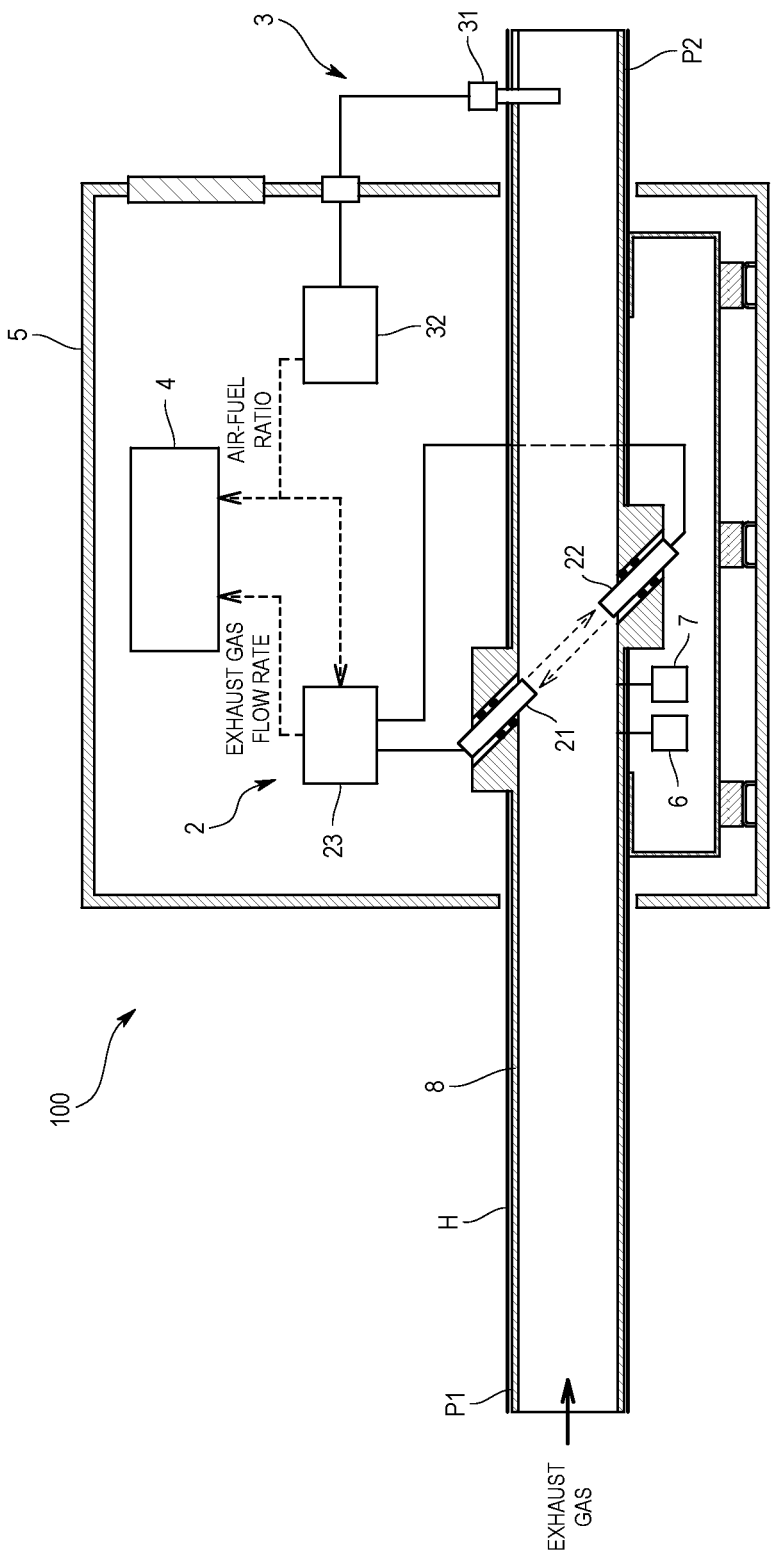
FIG. 1 is an overall view schematically showing a configuration of a fuel efficiency measurement device in accordance with one embodiment of this invention.
Figure 2:
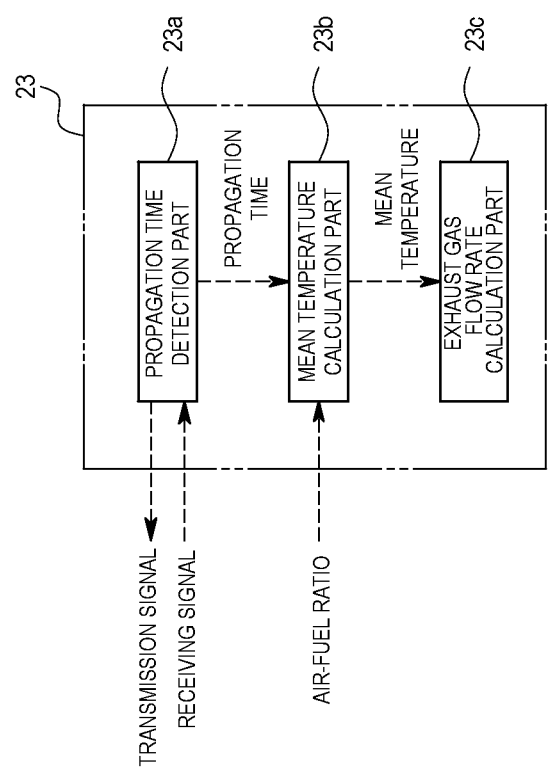
FIG. 2 is a function block diagram of an arithmetic part of an ultrasonic wave flow meter of this embodiment.

A fuel measurement device 100 of this embodiment is to measure a fuel consumption of an internal combustion engine, and comprises, as shown in FIG. 1, a tube body 8 that is mounted in series on an exhaust pipe of the internal combustion engine and where an exhaust gas flows, an air-fuel ratio sensor 3 that measures an air-fuel ratio, an ultrasonic wave flow meter 2 as being an exhaust gas flow rate measurement device that measures a flow rate of the exhaust gas flowing in the tube body 8, a temperature sensor 6 and a pressure sensor 7 each of which measures the temperature and the pressure respectively, and an arithmetic device 4 as being a fuel efficiency calculator that calculates a fuel consumption amount (Fe) of the internal combustion engine based on a measured value obtained by each sensor.

The tube body 8 is made of stainless continuously connected in series to, for example, a tail pipe, and is so configured to flow all of the exhaust gas discharged from the internal combustion engine.

A heater (H) is mounted on an outer circumference of the tube body 8 and the tube body 8 is heated to about 100 degrees Celsius to prevent various components in the exhaust gas from being cohered on an inner wall surface of the tube body 8.

The air-fuel ratio sensor 3 is of a direct insertion type mounted to penetrate a tube wall of the tube body 8, and arranged in a downstream side of the ultrasonic wave flow meter 2. The air-fuel ratio sensor 3 is a zirconia type sensor wherein an electrode is arranged on each surface of a zirconia ($ZrO_2$) solid electrolyte body and that detects an electromotive force in accordance with a difference of an oxygen concentration between both surfaces. Concretely, the air-fuel ratio sensor 3 comprises a sensing part 31 inside of which a heater to apply heat to the electrodes and the solid electrolyte body is incorporated and an arithmetic unit 32 that calculates the air-fuel ratio based on the oxygen concentration. A part or all of the functions of the arithmetic unit 32 may be omitted and the functions may be served by the arithmetic device 4 to be described later.

The ultrasonic wave flow meter 2 has a first ultrasonic wave transmitter-receiver 21 and a second ultrasonic wave transmitter-receiver 22 each of which is arranged in pairs to face each other to be sloped to an axial direction of the tube body 8, and an arithmetic unit 23.

The first and the second ultrasonic wave transmitter-receivers 21, 22 each of which is in pairs are mounted on a tube wall of the tube body 8.

The arithmetic unit 23 is a computer having a CPU and a memory or the like, and produces functions as a propagation time detection part 23a, a mean temperature calculation part 23b as a temperature measurement device and an exhaust gas flow rate calculation part 23c by cooperating the CPU and its peripheral devices based on a predetermined program stored in the memory. A part or all of the functions of this arithmetic unit 23 may be omitted and the functions may be served by an arithmetic device 4 to be described later.

Next, each part 23a~23c will be explained.

The propagation time detection part 23a detects propagation time of an ultrasonic wave pulse, namely propagation time of the ultrasonic wave toward the downstream direction (hereinafter also called as forward propagation time) and propagation time of the ultrasonic wave toward the upstream direction (hereinafter also called as reverse direction propagation time) by outputting a transmission signal to one of the ultrasonic wave transmitter-receivers 21 (or 22) and obtaining a receiving signal from the other ultrasonic wave transmitter-receiver 22 (or 21).

The mean temperature calculation part 23b calculates a temperature of the exhaust gas by the use of the forward propagation time and the reverse direction propagation time of the ultrasonic wave obtained by the propagation time detection part 23a and the air-fuel ratio obtained by the air-fuel sensor as a parameter.

First, a conceptual reason why the temperature of the exhaust gas can be calculated by the use of the parameter will be explained.

When the temperature changes, the propagation speed (a sound speed) of the ultrasonic wave also changes. As a result of this, it is possible to calculate the temperature of the exhaust gas by measuring the sound speed. However, since the sound speed changes also according to a density of the exhaust gas and the component of the exhaust gas and its density can be made clear based on the air-fuel ratio as being a value measured by the air-fuel ratio sensor, it is possible to calculate the temperature of the exhaust gas by the use of the parameter.

It will be more concretely explained.

There is a following relationship between the sound speed (C) [m/s], the forward propagation time ($T_{dn}$ [s]), the reverse direction propagation time ($T_{up}$ [s]) and a distance (L[m]) between the ultrasonic wave transmitter-receivers 21 and 22.

$$\frac{1}{T_{dn}} + \frac{1}{T_{up}} = \frac{2C}{L} \qquad \text{Expression (1)}$$

In addition, there is a relationship between the sound speed (C) and the temperature (t).

$$C = \sqrt{\frac{\kappa R t}{M}} \qquad \text{Expression (2)}$$

Where $\kappa$ is a ratio of specific heat of the exhaust gas, R is a gas constant and M is a mean molecular weight of the exhaust gas.

The following expression can be derived from the expression (1) and the expression (2).

$$\frac{1}{T_{dn}} + \frac{1}{T_{up}} = \sqrt{\frac{\kappa R}{M}} \cdot \frac{2}{L} \cdot \sqrt{T_{EX}} \qquad \text{Expression (3)}$$

Since the first term on the right hand of the expression (3) can be obtained from the air-fuel ratio and (L) is known, if the forward propagation time ($T_{dn}$) and the reverse direction propagation time ($T_{up}$) are measured, it is possible to obtain the temperature ($T_{EX}$) of the exhaust gas by the sum of these reciprocal numbers.

As a simplified method, it is also possible to obtain the temperature ($T_{EX}$) of the exhaust gas by dealing the first term on the right hand as a constant number with considering the composition of the exhaust gas to be generally constant on a constant basis. In this case, it is not necessary to use the air-fuel ratio. More specifically, the temperature ($T_{EX}$) of the exhaust gas may be obtained by the use of only the forward propagation time ($T_{dn}$) and the reverse direction propagation time ($T_{up}$) as a variable.

Then, the mean temperature calculation part 23b calculates the temperature ($T_{ex}$) based on the Expression (3) or by conducting an arithmetic operation that is equal with the Expression (3).

Figure 3:
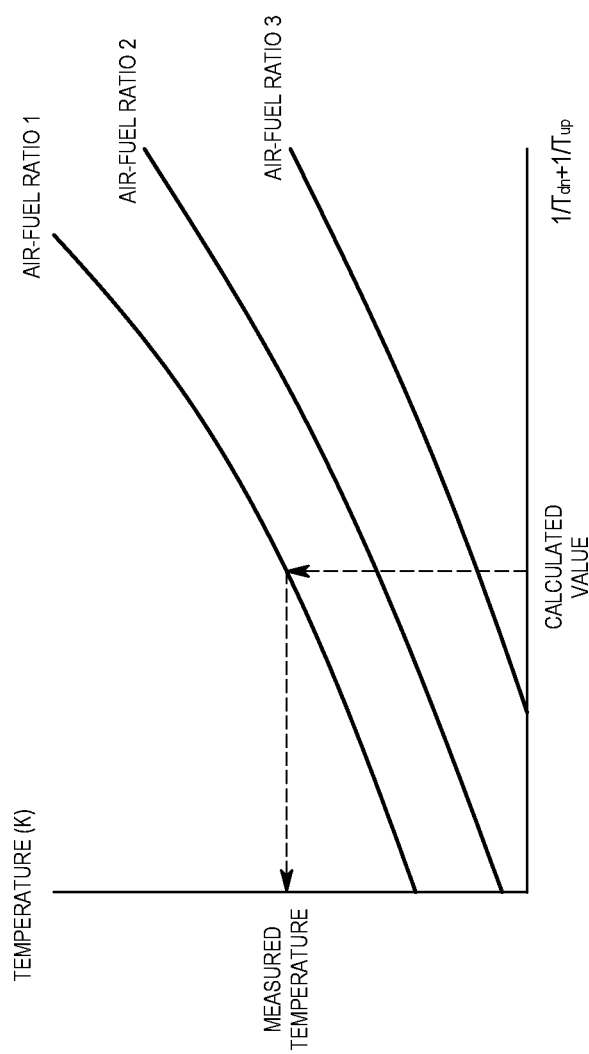
FIG. 3 is a correlation chart between temperature and propagation time to show graphically a map that is used in case that a mean temperature is calculated by a mean temperature calculation part in this embodiment.

Practically, a graph (shown in FIG. 3) indicating a relationship between the temperature (t), the forward propagation time ($T_{dn}$) and the reverse direction propagation time ($T_{up}$) for each air-fuel ratio as being a measured value of the air-fuel ratio sensor is stored in the memory as a map, and the mean temperature calculation part 23b calculates the temperature ($T_{EX}$) by applying the measured air-fuel ratio and the sum of the reciprocal number of the forward propagation time ($T_{dn}$) and the reciprocal number of the reverse direction propagation time ($T_{up}$)

Since the temperature ($T_{EX}$) is obtained because the ultrasonic wave extends in the radial direction of the exhaust gas, it can be considered to be a mean value of the temperature of the exhaust gas extending in the radial direction.

The exhaust gas flow rate calculation part 23c calculates the flow rate ($Q_{EX}$) of the exhaust gas in a normal state by receiving the temperature ($T_{EX}$) of the exhaust gas calculated by the mean temperature calculation part 23b and by the use of the following Expression (4) containing the temperature ($T_{EX}$) of the exhaust gas or by conducting an arithmetic operation that is equal with the following Expression (4). This is, so called, a normal conversion. In addition, the exhaust gas flow rate calculation part 23c outputs the flow rate ($Q_{EX}$) of the exhaust gas that can be displayed to a separately provided display or outputs it to an external information processing unit.

$$Q_{EX} = k_{profile} \cdot A \cdot v \cdot \frac{T_0}{T_{EX}} \cdot \frac{p_{EX}}{p_0} \qquad \text{Expression (4)}$$

Where $Q_{EX}$ is a volume flow rate [m³/min] of the exhaust gas in a normal state, $k_{profile}$ is a correction factor of the exhaust gas speed distribution in the tube body 8, A is a flow channel cross section [m²] of the tube body 8, $T_0$ is a normal temperature (=293.15) [K], $T_{EX}$ is a temperature [K] of the exhaust gas, $p_{EX}$ is a pressure [kPa] of the exhaust gas, and $p_o$ is a normal pressure (=101.3) [kPa].

In addition, v is a temporary flow rate [m/s] of the exhaust gas without considering the temperature that can be calculated by the following Expression (5). As is clear from this expression, v can be obtained from a difference between a reciprocal number of the forward propagation time ($T_{dn}$) and a reciprocal number of the reverse direction propagation time ($T_{up}$).

$$v = \frac{L}{2\cos\phi}\left(\frac{1}{T_{dn}} - \frac{1}{T_{up}}\right) \quad \text{Expression (5)}$$

The arithmetic device 4 is a dedicated or general purpose computer comprising a CPU, a memory, an input/output interface and an AD convertor, and is, as shown in FIG. 1, housed in a casing 5 arranged outside of the tube body 8 to surround the tube body 8. The arithmetic device 4 produces a function of calculating a fuel consumption amount by cooperating with the CPU and its peripheral devices according to a predetermined program stored in the memory.

Concretely, the arithmetic device 4 obtains the flow rate ($Q_{EX}$) of the exhaust gas measured by the ultrasonic wave flow meter 2 and the air-fuel ratio (AFR) measured by the air-fuel sensor 3 and successively calculates an instantaneous fuel consumption amount (Fe(t)) by the following Expression (6) with using the flow rate ($Q_{EX}$) of the exhaust gas and the air-fuel ratio (AFR) or by conducting an arithmetic operation that is equal with the Expression (6). Then the arithmetic device 4 outputs a value of the instantaneous fuel consumption amount (Fe(t)) that can be displayed to a separately provided display or outputs it to an external information processing unit $$Fe(t) = \frac{Q_{EX}(t)}{60} \cdot D_{EX} \cdot \frac{1}{AFR(t) + 1} \quad \text{Expression (6)}$$

Where Fe(t) is a fuel consumption ratio [g/s] at time (t), $Q_{EX}(t)$ is an exhaust gas flow rate [L/min] in a normal state (temperature 293.15K, pressure 101.3 kPa) at time (t), AFR(t) is an air-fuel ratio at time (t) and $D_{EX}$ is a density [kg/m$^3$] of the exhaust gas.

In accordance with this arrangement, it is possible to measure the flow rate more accurately even though the temperature of the exhaust gas flowing in the tube body 8 is uneven. As a result of this, it is possible to reduce an error of the normal flow rate as being the flow rate of the exhaust gas at a time when normal conversion is executed.

In addition, since the temperature is measured by the use of a part of the functions of the ultrasonic wave flow meter 2, there is no need of arranging a dedicated temperature sensor in the tube body 8 so that it is possible to simplify the configuration and to flow the exhaust gas without resistance in the tube body 8.

The present claimed invention is not limited to the above-mentioned embodiment.

For example, the temperature sensor 6 is provided in the above-mentioned embodiment, however, the temperature calculated by the mean temperature calculation part 23b may be corrected by the temperature measured by the temperature sensor 6. It is preferable that the temperature sensor 6 is detachable so as to be used only at a time of correction.

In addition, a sensor surface of the temperature sensor 6 may be arranged on a center in the radial direction of the tube body 8. Since the temperature sensor 6 is for correction, it may be arranged near the inner wall surface of the tube boy 8. As a position to be arranged in a direction of a flow, it is preferable to arrange the temperature sensor 6 near the ultrasonic wave flow meter 2.

The flow rate of the exhaust gas may be calculated not by measuring the temperature of the exhaust gas by the use of the ultrasonic wave flow meter but by providing multiple temperature sensors at positions each of which differs in the radial direction of the tube boy and measuring the temperature distribution of the exhaust gas in the radial direction. Each of the multiple temperature sensors may be arranged at two or more positions, for example, a center of the tube body in the radial direction, near an inner circumferential surface in the tube body, or a position between the center of the tube body and the inner circumferential surface. The multiple temperature sensors function as a temperature measurement device that measures the mean temperature or the temperature distribution of the sample fluid flowing in the tube body.

In accordance with this arrangement, since the temperature is based on not the mean temperature of the exhaust gas but the temperature distribution, it becomes possible to measure the flow rate with higher accuracy. However, unlike the above-mentioned arrangement wherein the temperature is measured by making use of the ultrasonic wave flow meter, since the temperature sensors are arranged in the tube body 8, there is a demerit that the temperature sensors become a fluid resistance.

The flow meter is not limited to the ultrasonic wave flow meter and other flow meter may be used.

This invention can be also applied to not only the exhaust gas but also various sample fluids.

A concrete example of the sample fluid other than the exhaust gas represented is air that is sucked by the internal combustion engine. In this case, the arrangement shown in the above-mentioned embodiment may be provided in the tube body as being a suction passage and the mean temperature of the air flowing in the tube body or the temperature distribution of the air along a radial direction of the tube body is measured and the flow rate of the air is measured based on the mean temperature or the temperature distribution. In addition, an object to be measured is not limited to gas and may be a sample fluid that contains gas or liquid.

In addition, it is a matter of course that the present claimed invention is not limited to the above-mentioned embodiment and may be variously modified without departing from a spirit of the invention.

EXPLANATION OF CODES

100 . . . fuel consumption measurement device
8 . . . tube body
2 . . . ultrasonic wave flow meter
21, 22 . . . ultrasonic wave transmitter-receiver
23b . . . temperature measurement device (mean temperature calculation part)
3 . . . air-fuel ratio sensor
4 . . . fuel consumption calculation part (arithmetic device)

What is claimed is:
1. A flow rate measurement device that comprises a temperature measurement device that measures a mean temperature of a sample fluid that flows in a tube body or temperature distribution of the sample fluid along a radial direction of the tube body, and that measures a flow rate of the sample fluid based on the mean temperature or the temperature distribution measured by the temperature measurement device, wherein the sample fluid is an exhaust gas that is discharged from an internal combustion engine and that flows in the tube body, and wherein the temperature measurement device measures the mean temperature of the exhaust gas that is discharged from the internal combustion engine and that flows in the tube body or the temperature distribution of the exhaust gas along the radial direction.

2. The flow rate measurement device described in claim 1, wherein the flow rate measurement device comprises a pair of ultrasonic wave transmitter-receivers and measures the flow rate of the sample fluid based on a propagation time of an ultrasonic wave that passes and propagates through the sample fluid between the pair of ultrasonic wave transmitter-receivers, and the temperature measurement device calculates the mean temperature of the sample fluid based on the propagation time.

3. The flow rate measurement device described in claim 1, wherein the temperature measurement device calculates the mean temperature of the exhaust gas further based on an air-fuel ratio of the internal combustion engine measured by a predetermined air-fuel ratio sensor.

4. The flow rate measurement device described in claim 1, wherein the flow rate measurement device comprises a pair of ultrasonic wave transmitter-receivers and calculates the flow rate of the exhaust gas based on a difference between a reciprocal number of a propagation time of an ultrasonic wave that propagates in an upstream direction of the exhaust gas between the pair of the ultrasonic wave transmitter-receivers and a reciprocal number of a propagation time of an ultrasonic wave that propagates in a downstream direction of the exhaust gas between the pair of the ultrasonic wave transmitter-receivers, wherein the flow rate of the exhaust gas is calculated further based on a temperature of the exhaust gas calculated from a sum of the reciprocal numbers.

5. A fuel efficiency measurement device comprising the flow rate measurement device described in claim 1, and a fuel efficiency calculation device that calculates fuel efficiency based on the flow rate of the exhaust gas measured by the flow rate measurement device.

6. A non-transitory computer readable storage medium that stores a program that is loaded on a flow rate measurement device that comprises a temperature measurement device that measures a mean temperature of a sample fluid that flows in a tube body or temperature distribution of the sample fluid along a radial direction of the tube body, and that measures a flow rate of the sample fluid based on the mean temperature or the temperature distribution measured by the temperature measurement device, and a pair of ultrasonic wave transmitter-receivers and a calculation part that calculates a flow rate of a sample fluid based on a propagation time of an ultrasonic wave that passes through the sample fluid and that propagates between the pair of ultrasonic wave transmitter-receivers, wherein the calculation part is provided with a function of calculating a mean temperature of the sample fluid based on the propagation time and a function of calculating the flow rate of the sample fluid based on the mean temperature, the sample fluid is an exhaust gas that is discharged from an internal combustion engine and that flows in the tube body, and the temperature measurement device measures the mean temperature of the exhaust gas that is discharged from the internal combustion engine and that flows in the tube body or the temperature distribution of the exhaust gas along the radial direction.

7. A flow rate measurement method comprising measuring a mean temperature of a sample fluid that flows in a tube body or temperature distribution of the sample fluid along a radial direction of the tube body and measuring a flow rate of the sample fluid based on the measured mean temperature or the measured temperature distribution, wherein the sample fluid is an exhaust gas that is discharged from an internal combustion engine and that flows in the tube body, and wherein the mean temperature or the temperature distribution is measured along the radial direction.

\* \* \* \* \*